1203X
P. Easton.
Earth Auger.
Patented Feb. 1, 1810.
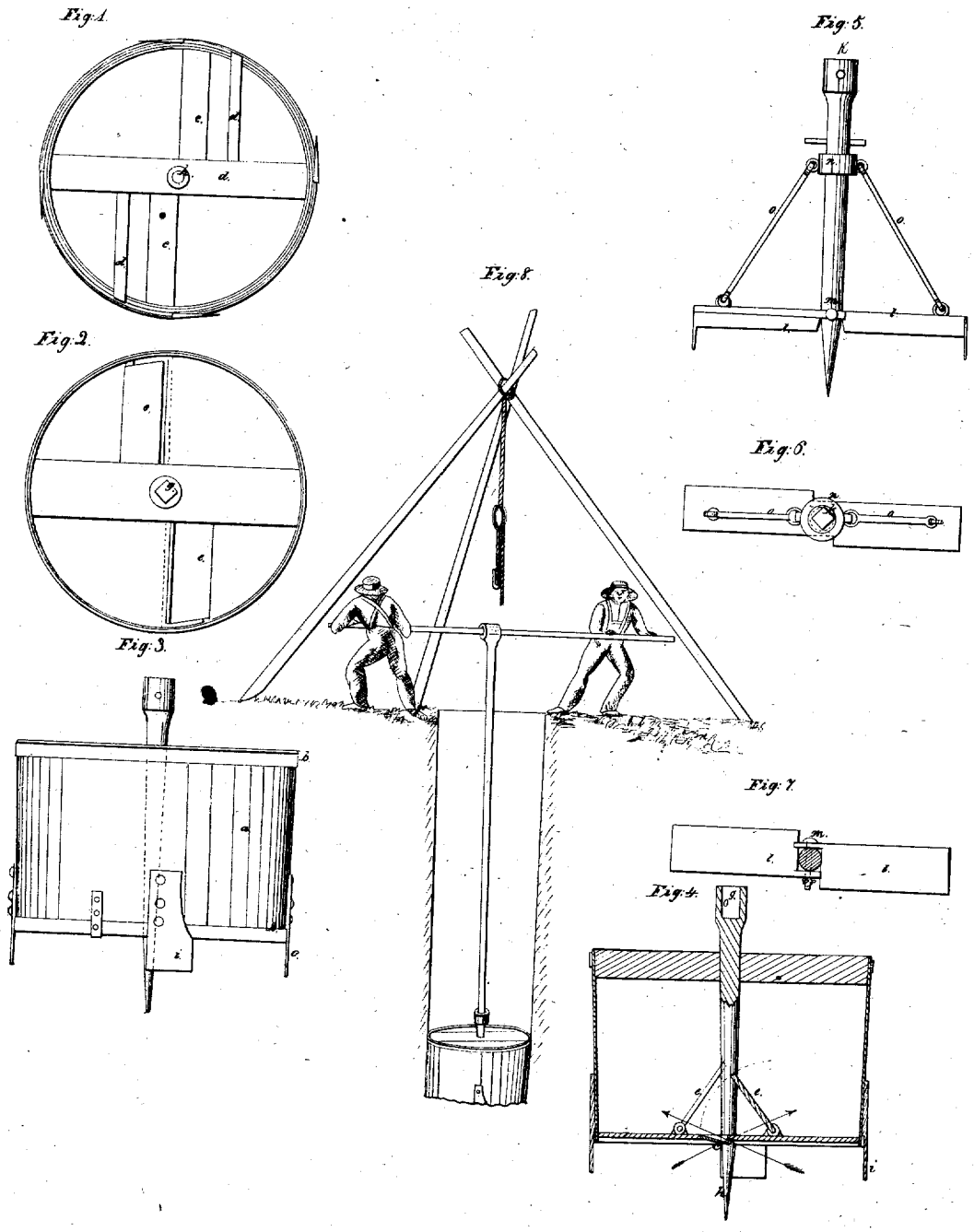
THE GRAPHIC CO. PHOTO-LITH. 39 & 41 PARK PLACE, N.Y.

1203X [illegible].1.1810

Peleg Easton
Letters Patent.

The Schedule referred to in these Letters Patent and making part of the
same containing a description in the words of the said Peleg Easton
himself of his machine for "setting Wells in a [illegible]."

The machine for receiving and extracting the sand Gravel &c from
the Well consists of wood or Sheet Iron resembling a tub or barrel
sawed in half, which may be varied in length or diameter; For the
Convenience of the user said machine being so nearly cylindrical as
for the diameter of the upper end or top not to exceed the diam: of
the lower end more than one half or 3/4 of an inch for the purpose of
receiving two Iron Hoops, one near the top and the other at the
bottom or smallest end to strengthen it, whether it be composed of
Wood or sheet Iron; across the centre of the bottom is fixed the cut
ter which consists of iron and steel, answering to the horizontal cutters of
the auger, within or under said cutter crossing at right angles,
the centre of said cutter and diameter of the machine is a strip of
iron equal in dimensions to that of the cutter which serves as are
[illegible] to the work, besides which there are several other pieces
of a less size; for the purpose of hanging the valves, braces to the cut
ters &c. all which [illegible] up on the outside of the machine and
are fastened with screws &c. the bottom or lining of the machine with
in the above described iron frame is, or may be sheet Iron, and
requires to be nearly or quite water tight. Across the centre of the
top extends from inside to inside a piece of wood thro' centre of which
a piece of iron with a socket at the upper end of 4 by 4 inches
and running to a point at the lower end passing thro the centre
of the Iron frame at the bottom answering to the centre screw of
the auger, the socket above mentioned to place the shank or shaft
in, two pieces or strips of iron of a less size alluded to above ex
tend across the bottom in a parallel line with the horizontal cutters,
one on the one side, and the other on the other side, about 6 in.

from the cutter which forms the length of the valves, and serves to hang
them on, in the outward circumference of the machine is placed four
perpendicular cutters or knives about four inches in length, at propor
tionate distances from each other which meets or receives the necessi
ty of the perpendicular cut of the auger and operates independent
therefrom. When the machine is revolving in its operation the centre
screw or pintle cuts off the centre of the earth, the perpendicular cut
ters or knives cut off the circumference similar to that of the auger
bit. while the horizontal cutters answering to that of the auger runs un
der the earth between the circumference and centre of the machine;
and receives it into the mouth of each valve, which when the com
pression is downward, the fore part of the valves gradually arises
from the cutter in proportion to the thickness of the earth between the
valves and the cutter answering to the core or borings of the auger
until the machine is full when raised from the bottom, the valves
x fall close on the top of the horizontal cutter and prevents the sand
or borings from returning, by which means the machine being full
consequently will hold no water. With respect to the other part
of the apparatus described in the draught for the purpose of boring
clay &c. it consists of iron particularly the socket and braces, the
cutters thereof are steeled and tempered; the socket is about 4 in.
square at top tapering downward to a point, similar to the other [illegible]
of above, both being wrought with the same shaft or shanks, 3 or
4 in. from the lower end of the point ...... or pintle, is a
hole about 3/4 of an inch in diam^r; to which the horizontal cut
ters are fixed, with a shoulder and a lip laying on opposite sides of the
pintle, each lip being perforated agreeing with that in the pintle,
thro which is placed a rivet forming a joint; below the socket is
a band of iron or traveller up and down, on opposite sides of wh. is
fastened one end of each brace, the other end extending to the hori
zontal cutter within 6 or 8 in^s of the outward end and fastening
to it, so that the machine being slung by the socket the traveller
and outward end of the cutters fall by means of the middle joint and contracts the diam.r again when it is let down into the well & compress
ed to the earth it distends or lengthens in diam.r sufficient to reach
the outside of the kerb, and when hove around with bars or handspikes,
as the other part of the machine describe above, it cuts and forms the
excavation as large or larger and smaller. By introducing a pin lower
below the socket and above the traveller, then the diam.r of the well
the outward ends of the cutters are sharpened and turned down serv
ing as perpendicular cutters to cut the circumference.

Witnesses
Gideon Gardner }
Hezek.h B Gardner }

Percy Easton

Exd. M.H.

(936 words) Drawing m.d.